(12) United States Patent
Pinedo et al.

(10) Patent No.: US 7,701,460 B2
(45) Date of Patent: Apr. 20, 2010

(54) GRAPHICS SYSTEMS AND METHODS

(75) Inventors: David Pinedo, Fort Collins, CO (US); John Marks, Fort Collins, CO (US); Roland M. Hochmuth, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 403 days.

(21) Appl. No.: 10/989,009

(22) Filed: Nov. 15, 2004

(65) Prior Publication Data

US 2006/0123141 A1 Jun. 8, 2006

(51) Int. Cl.
G06T 1/00 (2006.01)
G06T 15/00 (2006.01)
G06F 15/00 (2006.01)
G09G 5/00 (2006.01)

(52) U.S. Cl. ........................ 345/522; 345/501; 345/619; 345/628

(58) Field of Classification Search .................. 345/634, 345/629, 619, 628; 709/219; 395/825, 464
See application file for complete search history.

(56) References Cited

U.S. PATENT DOCUMENTS

| | | | | |
|---|---|---|---|---|
| 5,586,294 A * | 12/1996 | Goodwin et al. | ............ | 711/137 |
| 5,870,625 A * | 2/1999 | Chan et al. | ...................... | 710/5 |
| 5,949,432 A * | 9/1999 | Gough et al. | ................ | 345/629 |
| 6,628,297 B1 * | 9/2003 | Wraae et al. | ................. | 345/628 |
| 7,110,007 B2 * | 9/2006 | Odagawa | ..................... | 345/634 |
| 7,117,256 B1 * | 10/2006 | Blinn | ......................... | 709/219 |
| 2002/0122040 A1 * | 9/2002 | Noyle | .......................... | 345/522 |
| 2004/0008212 A1 * | 1/2004 | O'Neill | ....................... | 345/628 |
| 2004/0080519 A1 * | 4/2004 | Haskin | ........................ | 345/629 |

\* cited by examiner

*Primary Examiner*—Kee M Tung
*Assistant Examiner*—Jacinta Crawford (57) ABSTRACT

Embodiments of graphics systems and methods are disclosed. In one method embodiment, among others, a graphics method comprises receiving a first command having a first screen region, receiving a second command having a second screen region, and replacing the first command and the second command with a single command having one of the first screen region and the second screen region if the first screen region encompasses the second screen region or the second screen region encompasses the first screen region, respectively.

53 Claims, 4 Drawing Sheets

GRAPHICS SYSTEMS AND METHODS

BACKGROUND

Graphics systems generally enable a user to create and edit two-dimensional and/or three-dimensional objects on a computer screen. Remote graphics systems can often provide the functionality of a graphics system distributed among computers over one or more networks. Remote users are able to interact with a desktop and its applications as if they were using a local workstation, providing a collaborative, shared environment of graphics among a group of users in a wide variety of industries.

One problem in implementing remote graphics systems is that the data traffic across a communication link used to implement a remote graphics system can be high, thereby burdening computing resources.

SUMMARY

An embodiment of a graphics method comprises receiving a first command having a first screen region, receiving a second command having a second screen region, and replacing the first command and the second command with a single command having one of the first screen region and the second screen region if the first screen region encompasses the second screen region or the second screen region encompasses the first screen region, respectively.

An embodiment of a graphics system comprises driver logic configured to receive a first command having a first screen region, receive a second command having a second screen region, and substitute the first command and the second command with a single command having one of the first screen region and the second screen region if the first screen region encompasses the second screen region or the second screen region encompasses the first screen region, respectively.

An embodiment of a graphics system comprises means for receiving a first command having a source region and a destination region, means for receiving a second command having a source region and a destination region, and means for replacing the first command and the second command with a single command having the source region of the first command and the destination region of the second command if the source region of the second command corresponds to the destination region of the first command.

An embodiment of a graphics system on a computer-readable medium comprises logic configured to receive a first command having a source region and a destination region, logic configured to receive a second command having a source region and a destination region, and logic configured to replace the first command and the second command with a single command having the source region of the first command and the destination region of the second command if the source region of the second command corresponds to the destination region of the first command.

BRIEF DESCRIPTION OF THE DRAWINGS

The components in the drawings are not necessarily to scale, emphasis instead being placed upon clearly illustrating the principles of the disclosed systems and methods. Moreover, in the drawings, like reference numerals designate corresponding parts throughout the several views.

DETAILED DESCRIPTION

Disclosed herein are various embodiments of graphics systems and methods, herein referred to as a graphics system for brevity. Such a graphics system includes functionality to reduce the amount of data that is passed through a network, thus reducing the bandwidth necessary to implement a remote graphics system. In particular, embodiments of a graphics system provide for the elimination of redundant modify rectangle commands and for the reduction of sequential copy rectangle commands in a manner that reduces the amount of data that is processed and/or transmitted. Further, reducing sequential copy rectangle commands, common during translation of windows across a screen as requested by a user, can enable improved interactivity during such window moves, especially across low bandwidth communication lines.

Any process descriptions or blocks in flow charts should be understood as representing modules, segments, or portions of code which include one or more executable instructions for implementing specific logical functions in the process, and alternate implementations are included within the scope of the disclosure in which functions may be executed out of order from that shown or discussed, including substantially concurrently or in reverse order, depending on the functionality involved.

Figure 1:
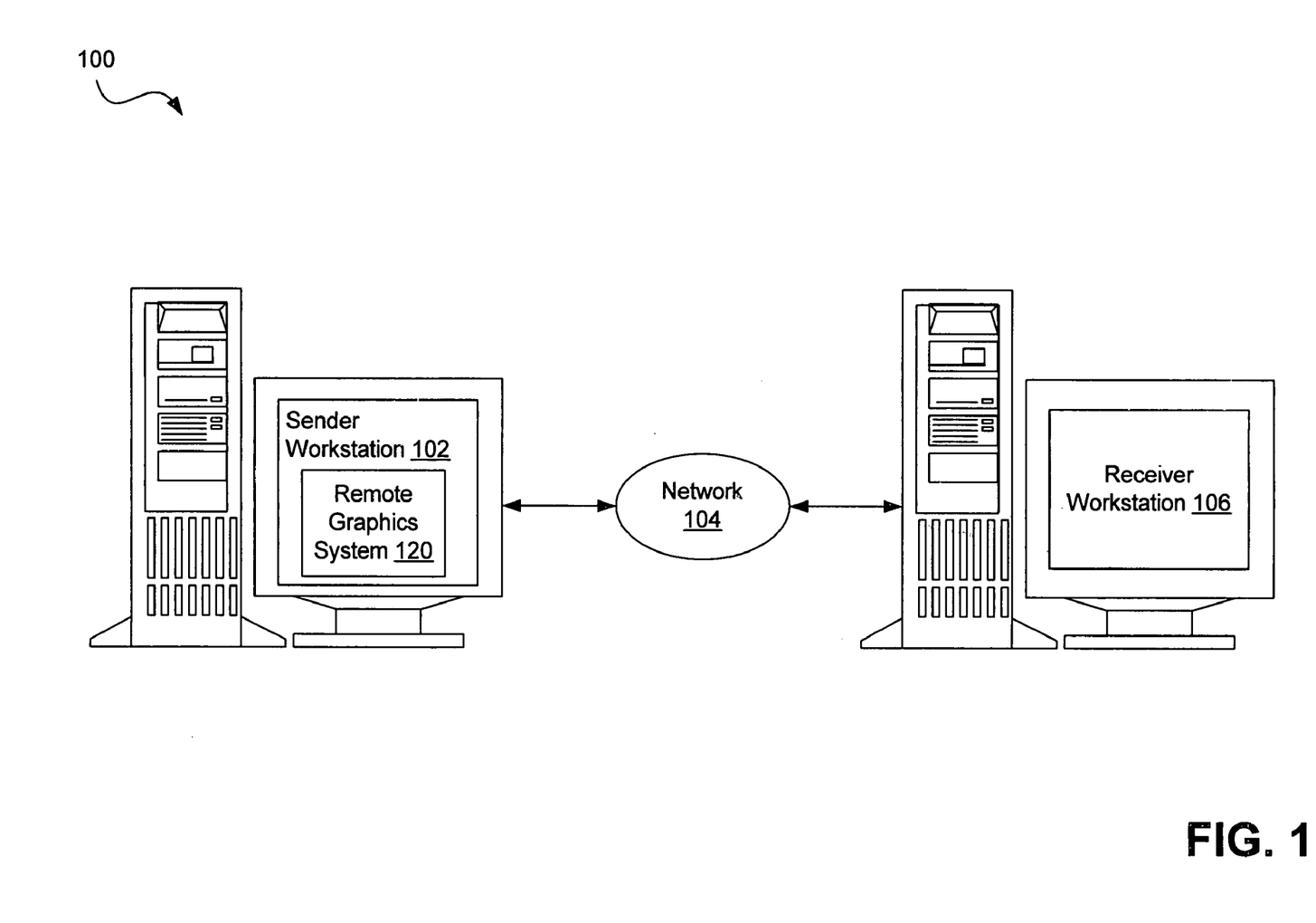
FIG. 1 is a block diagram that illustrates an example implementation for an embodiment of a graphics system.

FIG. 1 is a block diagram that illustrates a network infrastructure 100 that provides an environment for an embodiment of a graphics system 120. The network infrastructure 100 includes a sender workstation 102 that communicates over a network 104 with one or more receiver workstations 106. The network 104 may include a communications medium, such as a local or wide area network, among other media. The sender workstation 102 executes one or more applications and various graphics drivers of the graphics system 120, which monitors and records changes in the screen appearance of the display of the sender workstation 102. As a user works on the sender workstation 102 to perform various graphics functions, a user at the receiver workstation 106 can see these actions on a display of the receiver workstation 106. Additionally, a user at the receiver workstation 106 may interact with the graphics system 120 running on the sender workstation 102 as if he or she was interacting directly with the sender workstation 102. In one embodiment, the graphics system 120 compresses and sends information about screen changes to the receiver workstation 106. The receiver workstation 106 decompresses the information and updates the local display of the receiver workstation 106. The receiver workstation 106 can send keyboard and mouse events to the sender workstation 102, which are executed on the sender workstation 102.

Figure 2:
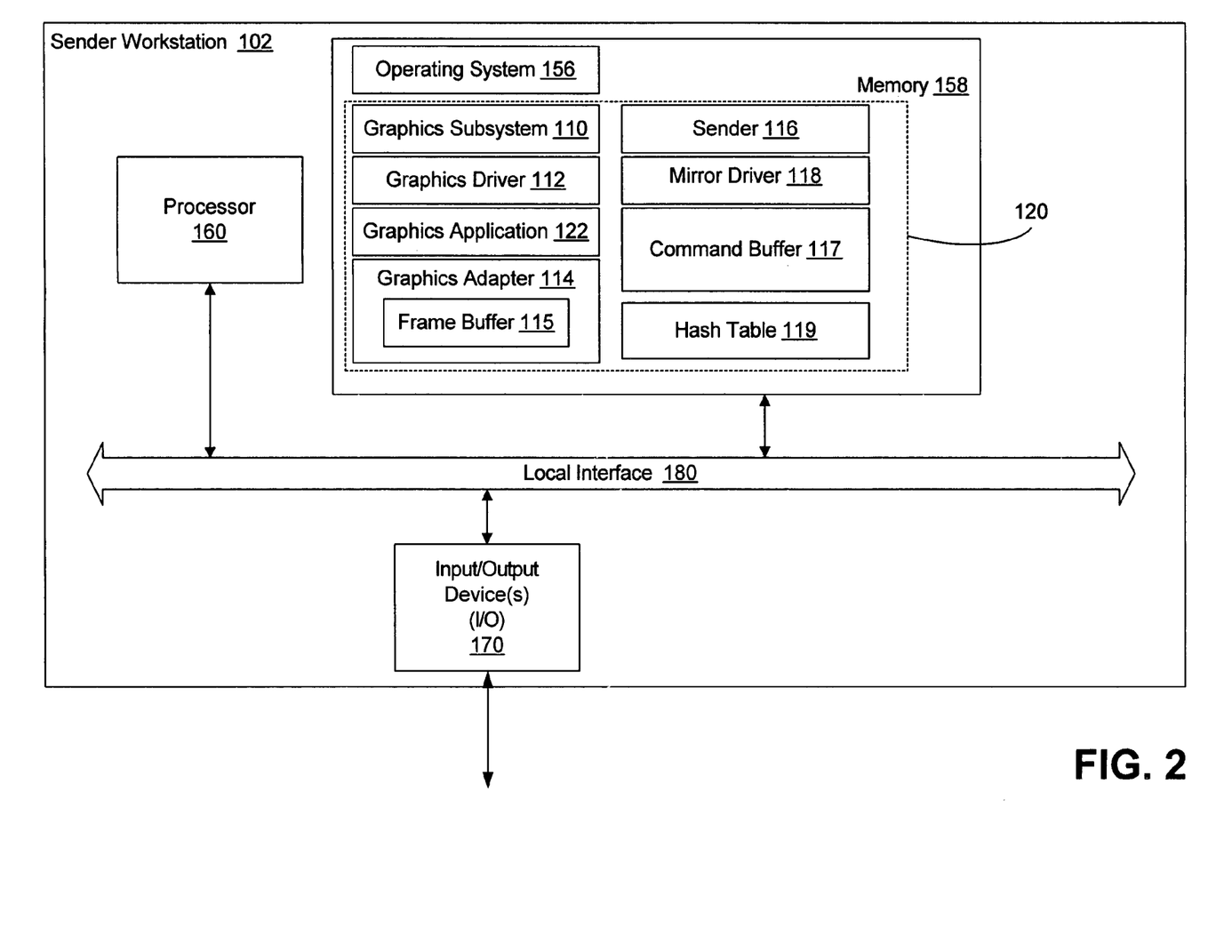
FIG. 2 is a block diagram that illustrates an embodiment of a graphics system such as might be implemented in the environment shown in FIG. 1.

FIG. 2 is a block diagram that illustrates an embodiment of the graphics system 120 as might be implemented in the sender workstation 102. The graphics system 120 comprises one or more modules, including a graphics subsystem 110, a graphics driver 112, a graphics adapter 114 (which may include a frame buffer 115), a sender module 116, a mirror driver 118, and a graphics application 122. Embodiments of graphics system 120 may include additional components shown in the sender workstation 102, such as a command buffer 117 and a hash table 119. In some embodiments, the functionality of one or more modules may be combined in a single module.

The graphics application 122, responsive to a user input (e.g., to draw a graphics image on a display screen) makes a call (e.g., via an applications programming interface, API) to the graphics subsystem 110. The graphics application 122 can include substantially any application that uses a graphics API, such as GDI, DIRECTDRAW, DIRECT3D, OPENGL, among other graphics APIs. The graphics subsystem 110 in turn may communicate a line draw request (or other graphics command) to the graphics driver 112. The graphics driver 112 receives the graphics command from the graphics subsystem 110 and transmits a graphics command to the graphics adapter 114. The graphics adapter 114 renders image data affected by the graphics command into a frame buffer 115, also known as a display surface, and further displays the results using an attached display device, such as a monitor. The frame buffer 115 may be located in the graphics adapter 114.

The mirror driver 118 includes at least some of the same functionality as the graphics driver 112. The mirror driver 118 also receives all or substantially all graphics commands that are sent from the graphics subsystem 110 to the graphics driver 112. The mirror driver 118 keeps track of all regions of the display of the sender workstation 102 that are changed as a result of implementing a graphics command. The mirror driver 118 also keeps track of the type of graphics command, as well as any parameters (e.g., dimensions, such as line primitive endpoints, etc.) of the graphics command that are drawn in each region. As a graphics command arrives from the graphics subsystem 110, the mirror driver 118 creates a list of commands in the command buffer 117 used by the sender 116. The command buffer 117 may also include other information, such as data corresponding to graphics primitives, among other information. The mirror driver 118 sends the list of the commands to the sender 116. The sender 116 uses the list to determine which regions of a screen have changed in response to a graphics command and reads from the part of the frame buffer 115 corresponding to the changed regions. The buffered commands (or reformatted variants thereof) may be sent to (or retrieved by) the sender 116 the next time the sender 116 is able to process additional commands to send to the receiver workstation 106 (FIG. 1).

The sender 116 may request a list of commands from the mirror driver 118, or the list may be sent to the sender 116 in the absence of a request by the sender 116. A screen region may be a geometric area, such as a rectangle, defined by an x-coordinate, y-coordinate, width, and height data as well as a type field that identifies the graphics command that was used to render the region. The sender 116 sends one or more commands to the receiver workstation 106 (FIG. 1), which then implements the received commands. The sender 116 can also send an area (e.g., pixels of an image, either compressed or not compressed) affected by a command to the receiver workstation 106. The sender 116 also can receive input/output data, such as keyboard and mouse events, from the receiver workstation 106, and process the same.

A receiver module is a software application or service in the receiver workstation 106 that receives commands from the sender 116 and displays the results in one or more windows. The receiver module can handle I/O data, such as keyboard and mouse events, and send them to the sender 116.

Generally, in terms of hardware architecture, the sender workstation 102 includes a processor 160, memory 158, and one or more input and/or output (I/O) devices 170 (or peripherals) that are communicatively coupled via a local interface 180. The local interface 180 can be, for example but not limited to, one or more buses or other wired or wireless connections. The local interface 180 may have additional elements, which are omitted for simplicity, such as controllers, buffers (caches), drivers, repeaters, and receivers, to enable communications. Further, the local interface 180 may include address, control, and/or data connections to enable appropriate communications among the aforementioned components.

The processor 160 is a hardware device for executing software, particularly that which is stored in memory 158. The processor 160 can be any custom made or commercially available processor, a central processing unit (CPU), an auxiliary processor among several processors associated with the sender workstation 102, a semiconductor-based microprocessor (in the form of a microchip or chip set), a macroprocessor, or generally any device for executing software instructions.

Memory 158 can include any one or combination of volatile memory elements (e.g., random access memory (RAM, such as DRAM, SRAM, SDRAM, etc.)) and nonvolatile memory elements (e.g., read-only memory (ROM)). Memory 158 cooperates through the local interface 180. In some embodiments, memory 158 may incorporate electronic, magnetic, optical, and/or other types of storage media. Note that memory 158 can have a distributed architecture, where various components are situated remote from one another, but can be accessed by the processor 160.

The software in memory 158 may include one or more separate programs, each of which comprises an ordered listing of executable instructions for implementing logical functions. In the embodiment shown in FIG. 2, the software in memory 158 includes a suitable operating system (O/S) 156 and the modules of the graphics system 120. In general, the operating system 156 essentially controls the execution of other computer programs, and provides scheduling, input-output control, file and data management, memory management, and communication control and related services.

The mirror driver 118 is a source program, executable program (object code), script, or any other entity comprising a set of instructions to be performed. The mirror driver 118 can be implemented as a single module, or as a distributed network of modules of like-functionality. When a source program, then the program is translated via a compiler, assembler, interpreter, or the like, which may or may not be included within the memory 158, so as to operate properly in connection with the O/S 156.

The I/O devices 170 may include input devices, for example but not limited to, a keyboard, mouse, scanner, microphone, etc. Furthermore, the I/O devices 170 may also include output devices, for example but not limited to, a printer, display, etc. Finally, the I/O devices 170 may further include devices that communicate both inputs and outputs, for instance but not limited to, a modulator/demodulator (modem for accessing another device, system, or network), a radio frequency (RF) or other transceiver, a telephonic interface, a bridge, a router, etc.

When the sender workstation 102 is in operation, the processor 160 is configured to execute software stored within the memory 158, to communicate data to and from the memory 158, and to generally control operations of the sender workstation 102 pursuant to the software. The mirror driver 118, for example, in whole or in part, but typically the latter, is read by the processor 160, sometimes buffered within the processor 160, and then executed.

When one or more modules of the graphics system 120 is implemented in software, as is shown in FIG. 2, it should be noted that the graphics system 120 can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. The graphics system 120 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

It will be appreciated that the various components described herein may be implemented in software, hardware, or a combination thereof. For example, when the functionality of one or more modules of the graphics system 120 is implemented in hardware (or a portion of the functionality of an individual module, such as the mirror driver 118, is implemented in hardware), the one or more modules (or portions thereof) of the graphics system 120 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc., or can be implemented with other technologies now known or later developed.

The type of commands implemented in the graphics system 120 can include graphics commands such as a text command, line command, bitmap draw command, and copy rectangle command, among others. A text command generally includes a command to display a string of text that is to be drawn using a specified font, font size, foreground color, and background color to a specified location. A line command generally includes a command to display one or more lines to be drawn using a specified line width, style, and color using specified endpoints. A bitmap draw command generally includes a command to display a bitmap to be drawn to a specified location with a specified width and height. A copy rectangle command generally includes a command to display a rectangle on the screen that is to be copied from a source to a destination region. Note that screen regions may be represented with other geometric shapes. Further, it is understood that commands as received by or generated from the various modules of the sender workstation 102 may have the same objective (e.g., rendering a line) but be configured in a different format (e.g., data format) among the various modules (including possibly having different information, as described below). Additionally, such commands may have the same objective but be configured in a different format (including possibly having different information) than similar commands sent from the sender workstation 102 to the receiver workstation 106 (FIG. 1). For example, the mirror driver 118 may receive a line command from the graphics subsystem 110 (FIG. 2) configured in a first format, and send a like-graphics command (i.e., a line command to render a line primitive on a display) to the command buffer 117 in a second format. Likewise, a line command may be provided by the sender 116 to the receiver workstation 106 based on the line command received from and buffered into the mirror driver 118 (i.e., based on the line command in the command buffer 117 having a second format), having the objective to cause the receiver workstation 106 to render a line on a display, yet configured in a different format for transmission (e.g., a third format).

Another command may be a modify rectangle command. Whether a modify rectangle command is of a version stored in a command buffer 117 (as provided by the mirror driver 118), or is of a version sent to the receiver workstation 106 (FIG. 1), a modify rectangle command specifies a particular rectangle on the screen that has been modified. However, a modify rectangle command sent by the sender 116 may include data (e.g., pixels) corresponding to screen regions that have changed, whereas a modify rectangle command stored in the command buffer 117 by the mirror driver 118 may not necessarily include pixel data. Thus, modify rectangle commands can result in a large amount of data to represent and transmit the screen changes. The amount of data that may need to be transmitted when an area of the screen is modified can be reduced by configuring the mirror driver 118 to send a graphics command to the sender 116, and having the sender 116 send a graphics command to the receiver workstation 106 (FIG. 1) to avoid transmitting data (e.g., pixels) in the modify rectangle command from the sender 116 to the receiver workstation 106. For example, a line, text, or copy rectangle command can be sent rather than the pixels of the rectangle that are modified by the line, text, copy command. The sender 116 uses the information included in the modify rectangle command stored in the command buffer 117 to determine what part of a screen to read (e.g., read from the frame buffer 115) and send to the receiver workstation 106 (FIG. 1). Commands buffered up between the mirror driver 118 and the sender 116 can sometimes overflow the command buffer 117. By reducing the number of commands in the command buffer 117, overflow is less likely to occur.

Figure 3:
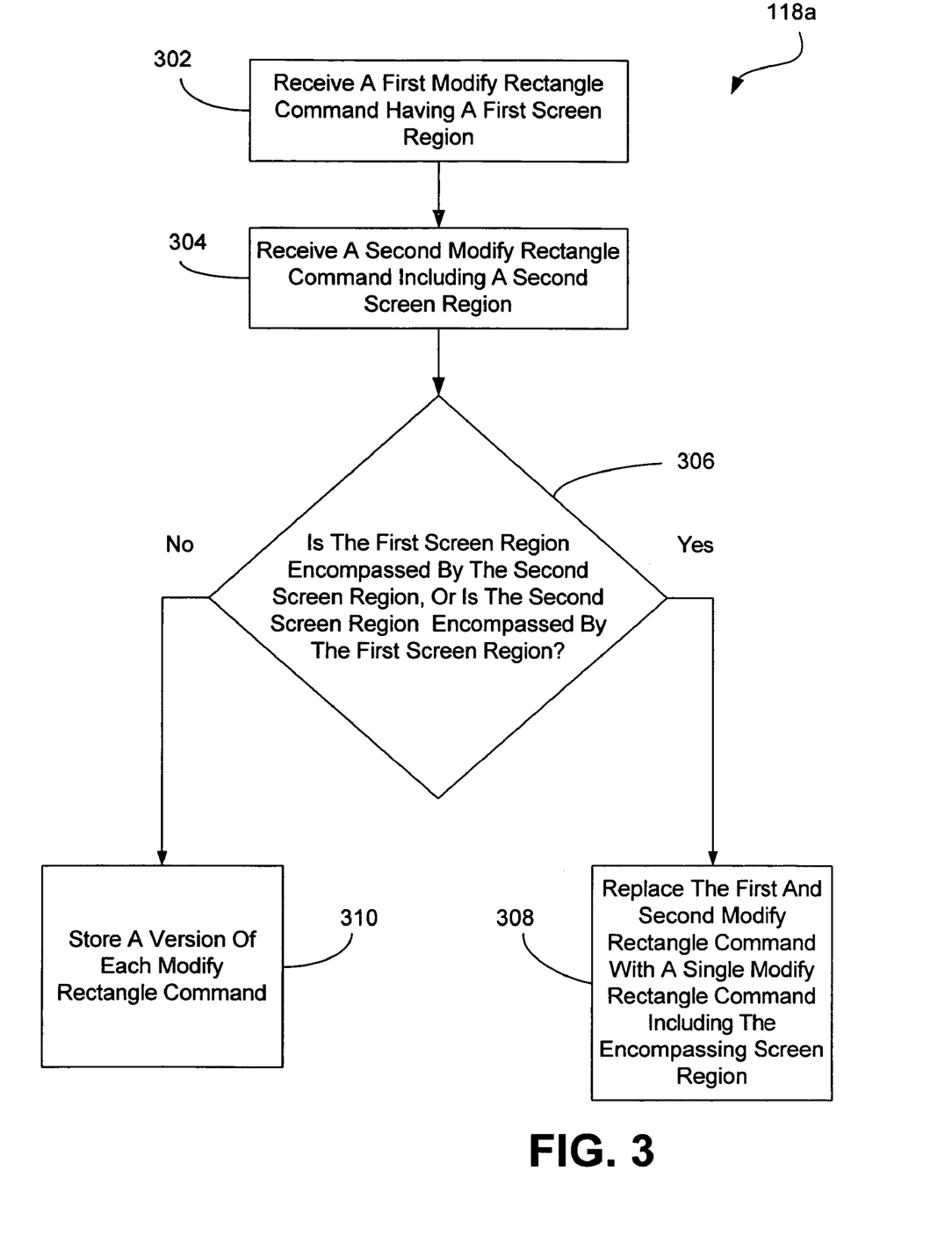
FIG. 3 is a flow diagram that illustrates a method embodiment for eliminating redundant modify rectangle commands.

FIG. 3 is a flow diagram that illustrates a method embodiment 118a for eliminating redundant modify rectangle commands. As the mirror driver 118 (FIG. 2) accumulates a buffer of commands in the command buffer 117 (FIG. 2) for use by the sender 116 (FIG. 2), it can look at sequence of commands in the buffer 117 and eliminate redundant commands, reducing the number of commands to be sent to the sender 116, and thus the amount of data to be transmitted from the sender 116 to the receiver workstation 106 (FIG. 1).

Assume, for example, a modify rectangle command has the following information: modify (r), where r represents a rectangle that is to be modified. The rectangle, r, is located at x and y coordinates, and has dimensions of width and height. In operation, the sender 116 (FIG. 2) can send a modify rectangle command (formatted to include pixel data) to the receiver workstation 106 (FIG. 1) to be executed by the receiver workstation 106. Referring to FIG. 3, the mirror driver 118a receives a first modify rectangle command having a first screen region (e.g., rectangle, r1) (302), and a second modify rectangle command having a second screen region (e.g., rectangle, r2) (304). The mirror driver 118a determines whether the first screen region (rectangle, r1) is encompassed by the second screen region (rectangle, r2), or whether the second screen region is encompassed by the first screen region (306). A screen region may be considered to encompass another screen region if the screen regions are equal in area or if one screen region is a subset of the other (e.g., the first screen region is entirely encompassed within the second screen region, but the first screen region has a smaller area than the area defined by the second screen region). If so ("yes" to 306), the mirror driver 118a replaces (or substitutes) the two command sequences with a single command sequence that includes the screen region that encompasses the other screen region (308). For example, if the first screen region encompasses the second screen region, then the replacement would be modify (r1). Otherwise (if "no" to 306), each modify rectangle command is stored (310) (e.g., in a different format) in the command buffer 117 (FIG. 2) to make a reformatted version of the same available for transmission to the receiver workstation 106. There may be other commands, of any type, between two modify rectangle commands, which do not restrict the use of the aforementioned optimization. Further, although two modify rectangle commands are shown, additional modify rectangle commands may be subject to replacement into a single modify rectangle command.

In some embodiments, the replacement of the two (or more) commands with a single command may be implemented by using a screen region that is the union of the first and second screen regions.

Figure 4:
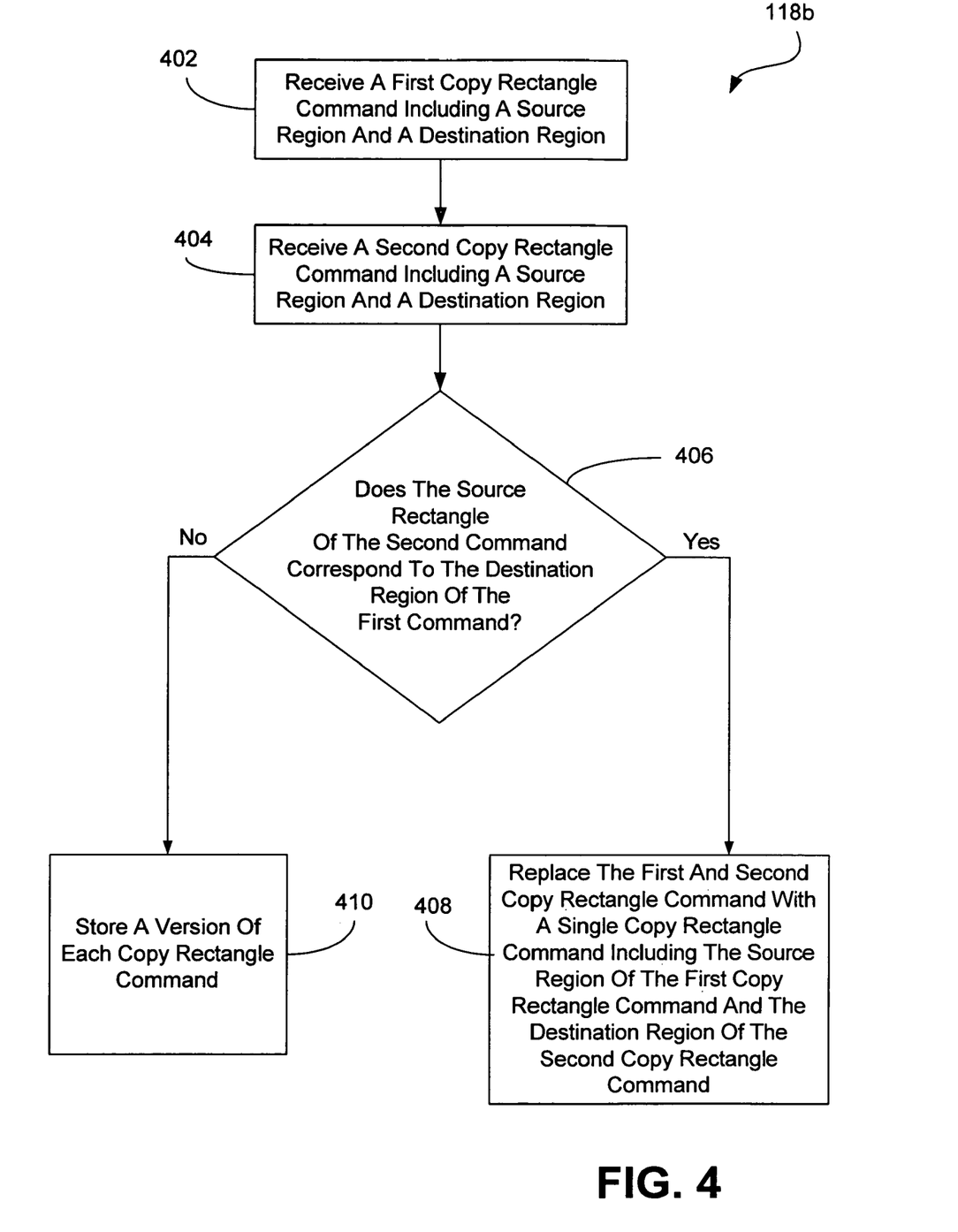
FIG. 4 is a flow diagram that illustrates a method embodiment for replacing sequential copy rectangle commands.

FIG. 4 is a flow diagram that illustrates a method embodiment 118b for replacing sequential copy rectangle commands in the graphics system 120 shown in FIG. 2. Assume, for example, a copy rectangle command has the following information: copy (r1, r2), where a rectangle, r1 (located at coordinates x1, y1 and having dimensions of width and height), is to be copied to a rectangle, r2 (located at coordinates x2, y2 and having dimensions of width and height). The sender 116 (FIG. 2) can send a reformatted version of this copy rectangle command to the receiver workstation 106 (FIG. 1), and the receiver workstation 106 is to execute the reformatted version of the copy rectangle command at the receiver workstation 106. Referring to FIG. 4, the mirror driver 118b receives a first copy rectangle command, copy (r1, r2) (402) and a second copy rectangle command (r2, r3) (404). Such a copy sequence may occur, for example, when a window is being interactively moved around a display screen. The mirror driver 118b determines whether the source rectangle (r2) of the second copy rectangle command is the same rectangle as the destination rectangle (r2) of the first copy rectangle command (406). If so ("yes" to 406), the mirror driver 118b can replace (or substitute) the two copy rectangle commands with a single command, copy (r1, r3) (408). Otherwise, (if "no" to 406), the mirror driver 118b can store each copy rectangle command (e.g., a reformatted version of the same) in the command buffer 117 (FIG. 2) (410) for eventual retrieval, formatting, and subsequent transmission by the sender 116.

There may be other commands between copy rectangle commands, and thus sequenced copy rectangle commands before and after the intervening command(s) may be replaced by a single copy rectangle command according to the methodology described above. Although shown using two copy rectangle commands, additional copy rectangle commands can also be added and thus substituted with a single command for the corresponding sequence.

As graphics operations arrive, the mirror driver 118 (FIG. 2) adds commands to send to the sender 116 (FIG. 2) in the command buffer 117 in memory 158 (FIG. 2). To keep track of all commands in the buffer 117, the mirror driver 118 maintains a hash table 119. For example, the mirror driver 118 may expedite searching of the accumulated buffer 117 for redundant modify rectangle commands or a copy rectangle command with a specified destination rectangle through the use of the hash table 119. The hash table 119 is indexed by a hash index, which can be generated by the mirror driver 118 as a function of the type of command and destination rectangle information. For a modify rectangle command, the hash index may be computed as a function of a command type and as a function of a modified rectangle having coordinates (e.g., x, y) dimensions of width (w) and height (h). Similarly, for a copy rectangle command, the hash index may be computed as a function of a command type and as a function of a destination rectangle at coordinates x2 and y2, the destination rectangle having dimensions of width (w) and height (h). In one embodiment, each entry in the hash table 119 may hold a limited number of pointers into the command buffer 117 to enable handling of hash function collisions (as an example, and not by way of limitation, 5 collisions, or entries (values) in a particular hash index). For more than 5 collisions in one hash table entry, for example, further commands that hash an entry to that hash table entry are simply not inserted into the hash table 119, and those commands cannot be used in optimizations.

In some embodiments, the hash table 119 may be replaced with an array, linked list, or other data structures. Further, although the discussion has been in the context of modify and copy commands, other embodiments extend to send commands such as draw line, text, draw polygon, etc.

What is claimed:

1. A graphics method involving computer-implemented method steps, comprising:
   receiving a first graphics command of a first command type having a first screen region;
   receiving a second graphics command of the first command type having a second screen region, the first screen region and the second screen region corresponding to regions on a computer screen; and
   replacing the first graphics command and the second graphics command with a single graphics command having one of the first screen region and the second screen region if the first screen region encompasses the second screen region or the second screen region encompasses the first screen region, respectively.

2. The method of claim 1, wherein receiving the first graphics command and the second graphics command comprises receiving a first modify command and receiving a second modify command, and wherein replacing comprises replacing the first modify command and the second modify command with a single modify command.

3. The method of claim 1, wherein receiving the first graphics command and the second graphics command comprises receiving the first graphics command having an area defined by a rectangle and receiving the second graphics command having an area defined by a rectangle.

4. The method of claim 1, further comprising storing a version of the first graphics command and a version of the second graphics command if the first screen region does not encompass the second screen region and the second screen region does not encompass the first screen region.

5. The method of claim 1, further comprising sending a version of the single graphics command to a receiver device.

6. The method of claim 1, further comprising storing a version of at least one of the first graphics command, the second graphics command, and the single graphics command in a command buffer.

7. The method of claim 6, further comprising providing a hash table and storing an index to the version of at least one of the first graphics command, the second graphics command, and the single graphics command stored in the command buffer in the hash table.

8. The method of claim 1, further comprising determining whether the first screen region encompasses the second screen region and whether the second screen region encompasses the first screen region.

9. A graphics system including a processor and memory, comprising:
   driver logic configured to receive a first graphics command of a first command type comprising a first screen region, receive a second graphics command of the first command type comprising a second screen region, the first screen region and the second screen region corresponding to regions on a computer screen, and substitute the first graphics command and the second graphics command with a single graphics command having one of the first screen region and the second screen region if the first screen region encompasses the second screen region or the second screen region encompasses the first screen region, respectively.

10. The system of claim 9, wherein the first graphics command, the second graphics command, and the single graphics command each comprise a modify command.

11. The system of claim 9, wherein the first screen region and the second screen region each comprise an area defined by a rectangle.

12. The system of claim 9, wherein the driver logic is configured to store a version of the first graphics command and a version of the second graphics command if the first screen region does not encompass the second screen region and the second screen region does not encompass the first screen region.

13. The system of claim 9, wherein the driver logic is configured to store a version of at least one of the first graphics command, the second graphics command, and the single graphics command in a command buffer.

14. The system of claim 13, wherein the driver logic is configured to provide a hash table and store an index to the version of at least one of the first graphics command, the second graphics command, and the single graphics command stored in the command buffer in the hash table.

15. The system of claim 13, further comprising sender logic, wherein at least one of the driver logic and sender logic are configured to search for the version of at least one of the first graphics command, the second graphics command, and the single graphics command from the command buffer using an index in a hash table.

16. The system of claim 9, further comprising sender logic, wherein the sender logic is configured to retrieve and send a version of the single graphics command to a remote device.

17. The system of claim 9, wherein the driver logic is configured at least partially in hardware.

18. The system of claim 9, wherein the driver logic is configured to determine whether the first screen region encompasses the second screen region and whether the second screen region encompasses the first screen region.

19. The system of claim 9, further comprising sender logic, wherein the sender logic is configured to send a version of the single graphics command to a receiver device.

20. A graphics system including a processor and memory, comprising:
means for receiving a first graphics command of a first command type having a first screen region;
means for receiving a second graphics command of the first command type having a second screen region, the first screen region and the second screen region corresponding to regions on a computer screen; and
means for substituting the first graphics command and the second graphics command with a single graphics command having one of the first screen region and the second screen region if the first screen region encompasses the second screen region or the second screen region encompasses the first screen region, respectively.

21. The system of claim 20, wherein the means for receiving the first graphics command and the means for receiving the second graphics command comprises at least one of a mirror driver, a graphics subsystem, a command buffer, and a processor.

22. The system of claim 20, wherein the means for substituting comprises at least one of a mirror driver, a command buffer, a hash table, and a processor.

23. The system of claim 20, further comprising means for storing a version of at least one of the first graphics command, the second graphics command, and the single graphics command.

24. The system of claim 20, wherein the first graphics command, the second graphics command, and the single graphics command each comprise a modify command.

25. A computer-readable medium having a graphics system embodied thereon, comprising:
logic configured to receive a first graphics command of a first command type having a first screen region;
logic configured to receive a second graphics command of the first command type having a second screen region, the first screen region and the second screen region corresponding to regions on a computer screen; and
logic configured to replace the first graphics command and the second graphics command with a single graphics command having one of the first screen region and the second screen region if the first screen region encompasses the second screen region or the second screen region encompasses the first screen region, respectively.

26. The computer-readable medium of claim 25, further comprising logic configured to store a version of at least one of the first graphics command, the second graphics command, and the single graphics command.

27. The computer-readable medium of claim 25, further comprising logic configured to transmit a version of at least one of the first graphics command, the second graphics command, and the single graphics command to a remote device.

28. The computer-readable medium of claim 25, wherein the first graphics command, the second graphics command, and the single graphics command each comprise a modify command.

29. A graphics method involving computer-implemented method steps, comprising:
receiving a first graphics command of a first command type having a source region and a destination region, the source region and the destination region each corresponding to regions on a computer screen;
receiving a second graphics command of the first command type having a source region and a destination region, the source region and the destination region each corresponding to regions on the computer screen; and
replacing the first graphics command and the second graphics command with a single graphics command having the source region of the first graphics command and the destination region of the second graphics command if the source region of the second graphics command corresponds to the destination region of the first graphics command.

30. The method of claim 29, wherein receiving the first graphics command and receiving the second graphics command comprises receiving a first copy command and receiving a second copy command, respectively, and wherein replacing comprises replacing the first copy command and the second copy command with a single copy command.

31. The method of claim 29, wherein receiving and replacing comprises receiving the first graphics command having a source area defined by a rectangle and a destination area defined by a rectangle, receiving the second graphics command having a source area defined by a rectangle and a destination area defined by a rectangle, and replacing the first graphics command and the second graphics command with the single graphics command having a source area defined by a rectangle and a destination area defined by a rectangle.

32. The method of claim 29, further comprising storing a version of the first graphics command and a version of the second graphics command if the source region of the second graphics command does not correspond to the destination region of the first graphics command.

33. The method of claim 29, further comprising sending a version of the single graphics command to a receiver device.

34. The method of claim 29, further comprising storing a version of at least one of the first graphics command, the second graphics command, and the single graphics command in a command buffer.

35. The method of claim 34, further comprising providing a hash table and storing an index to the version of at least one of the first graphics command, the second graphics command, and the single graphics command stored in the command buffer in the hash table.

36. A graphics system including a processor and memory, comprising:
   driver logic configured to receive a first graphics command of a first command type having a source region and a destination region, the source region and the destination region each corresponding to regions on a computer screen, and receive a second graphics command of the first command type having a source region and a destination region, the source region and the destination region each corresponding to regions on the computer screen, the driver logic configured to substitute the first graphics command and the second graphics command with a single graphics command that has the source region of the first graphics command and the destination region of the second graphics command if the source region of the second graphics command is substantially the same as the destination region of the first graphics command.

37. The system of claim 36, wherein the first graphics command, the second graphics command, and the single graphics command each comprise a copy command.

38. The system of claim 36, wherein the source region and the destination region of the first graphics command, the second graphics command, and the single graphics command each comprise an area defined by a rectangle.

39. The system of claim 36, wherein the driver logic is configured to store a version of the first graphics command and a version of the second graphics command if the source region of the second graphics command does not correspond to the destination region of the first graphics command.

40. The system of claim 36, further comprising sender logic, wherein the sender logic is configured to send a version of the single graphics command to a receiver device.

41. The system of claim 36, wherein the driver logic is configured to store a version of at least one of the first graphics command, the second graphics command, and the single graphics command in a command buffer.

42. The system of claim 41, wherein the driver logic is configured to provide a hash table and store an index to the version of at least one of the first graphics command, the second graphics command, and the single graphics command stored in the command buffer in the hash table.

43. The system of claim 41, further comprising a sender logic, wherein at least one of the driver logic and sender logic are configured to search for the version of at least one of the first graphics command, the second graphics command, and the single graphics command from the command buffer using an index in a hash table.

44. The system of claim 36, further comprising sender logic, wherein the sender logic is configured to retrieve and send a version of the single graphics command to a remote device.

45. The system of claim 36, wherein the driver logic is configured at least partially in hardware.

46. A graphics system including a processor and memory, comprising:
   means for receiving a first graphics command of a first command type having a source region and a destination region, the source region and the destination region each corresponding to regions on a computer screen;
   means for receiving a second graphics command of the first command type having a source region and a destination region, the source region and the destination region each corresponding to regions on the computer screen; and
   means for replacing the first graphics command and the second graphics command with a single graphics command having the source region of the first graphics command and the destination region of the second graphics command if the source region of the second graphics command corresponds to the destination region of the first graphics command.

47. The system of claim 46, wherein the means for receiving a first graphics command and the means for receiving a second graphics command comprises at least one of a mirror driver, a graphics subsystem, a command buffer, and a processor.

48. The system of claim 46, wherein the means for replacing comprises at least one of a mirror driver, a command buffer, a hash table, and a processor.

49. The system of claim 46, wherein the first graphics command, the second graphics command, and the single graphics command each comprise a copy command.

50. A computer-readable medium having a graphics system embodied thereon, comprising:
   logic configured to receive a first graphics command of a first command type having a source region and a destination region, the source region and the destination region each corresponding to regions on a computer screen;
   logic configured to receive a second graphics command of the first command type having a source region and a destination region, the source region and the destination region each corresponding to regions on the computer screen; and
   logic configured to replace the first graphics command and the second graphics command with a single graphics command having the source region of the first graphics command and the destination region of the second graphics command if the source region of the second graphics command corresponds to the destination region of the first command.

51. The computer-readable medium of claim 50, further comprising logic configured to store a version of at least one of the first graphics command, the second graphics command, and the single graphics command.

52. The computer-readable medium of claim 50, further comprising logic configured to transmit a version of at least one of the first graphics command, the second graphics command, and the single graphics command to a remote device.

53. The computer-readable medium of claim 50, wherein the first graphics command, the second graphics command, and the single graphics command each comprise a copy command.

* * * * *